3,386,985
TRIAZENOMETAL COMPOUNDS AND
METHOD OF PREPARATION
Frederick E. Brinckman, Jr., Washington, D.C., and Hermann S. Haiss and Robert A. Robb, Indian Head, Md., assignors to the United States of America as represented by the Secretary of the Navy
No Drawing. Filed June 12, 1964, Ser. No. 374,860
5 Claims. (Cl. 260—140)

The invention described herein may be manufactured and used by or for the Government of the United States of America for governmental purposes without the payment of any royalties thereon or therefor.

This invention relates to a novel chemical reaction and products obtained thereby. More particularly, the invention relates to the preparation of reactive triazene compounds obtained via a "nitrogen-Grignard" reagent. Specifically, the invention is directed to the reaction of organic azides with Grignard reagents and the subsequent treatment, of the organonitrogen-Grignard so-prepared, with a metal halide, metalloid halide or organometal halide in order to produce novel triazene derivatives characterized by a covalent metal-nitrogen bond.

In the past, certain metal-triazene derivatives have been prepared by a method which involved the reaction of a free triazene with a metallic salt such as, for example, a metallic halide in the presence of an alcoholic or ketonic reaction medium. For example, diphenyltriazene compounds of Na, Ag, Hg, Cu, Ni and Pd have been prepared in this manner. This method, however, suffered from the drawback that the variety of metal compounds which could be prepared thereby was severely limited. Since alcoholic or ketonic diluents were necessarily used, the reaction was limited to the preparation of the above disclosed metallic derivatives because of, among others, difficulties encountered in removing the solvent of crystallization of the product. Moreover the use of salts, such as, for example, halides, of metals was excluded because of the tendency of side reactions involving preferential formation of metal-oxygen bonds to prevail.

Accordingly, in application Ser. No. 367,599, filed May 14, 1964, and of common assignment, there is disclosed the preparation of certain novel metal-triazene compounds by the metathetical reaction of 1,3-diphenyltriazeno silver with a metal halide or organometal halide in a non-reactive diluent.

It has now been found that novel symmetrical and unsymmetrical metal-triazene and metalloid-triazene compounds may be directly prepared by reacting an organic azide with a Grignard reagent and treating the intermediate "nitrogen-Grignard" in situ with a metal halide or organometal halide.

The novel metal- or metalloid - 1,3 - diorganotriazene compounds prepared by the method of this invention may be represented by the following general formula:

(R—N—N=N—R')$_n$M wherein R and R' are the same or different substituted or unsubstituted aliphatic or aromatic organic radicals or combinations thereof having no substituent reactive with a metal halide. M is a metal- or metalloid-containing moiety and $n$ is an integer.

REACTANTS

The method of this invention is carried out by initially reacting an organic azide of the formula RN$_3$, wherein R is a substituted or unsubstituted aliphatic or aromatic organic radical or combination thereof such as alkyl, aryl, aralkyl, and alkaryl having no substituent reactive with a metal halide and N$_3$ is an azido group, with a Grignard reagent of the formula RMgX wherein R is as defined above and X is Cl, Br or I. The intermediate thus formed is typified as a "nitrogen-Grignard" reagent and is represented by the formula (RN$_3$R)MgX wherein R and X are defined as set forth above.

Exemplary organic azides which may be used in the method of the invention are alkyl, aryl, alkaryl, aralkyl, cycloaliphatic azides and fluorinated aromatic azides such as phenyl azides, perfluorophenyl azide, tolyl azide, anthryl azide, cumyl azide, xylyl azide, methyl azide, ethyl azide, propyl azide, amyl azide, isopropyl azide, isobutyl azide, cyclopentyl azide, cyclohexyl azide and higher homologs.

Exemplary Grignard reagents which may be used in the method of the invention are those having the formula RMgX as set forth above wherein R may be phenyl, tolyl, xylyl, methyl, ethyl, butyl and higher homologs thereof and X is Cl, Br or I.

The "nitrogen-Grignard" intermediate is then reacted with a halide of the formula MX$_n$ or R$_m$MX$_n$ wherein M is a metal or metalloid of Groups I–VI of the Periodic Table, R and X are as defined above with the addition of fluorine and $m$ and $n$ are integers. Exemplary compounds are the halides of aluminum, zirconium, tin, silicon, titanium, phosphorous and boron such as, for example, aluminum trichloride, titanium tetrachloride, borontrifluoride, tin chloride, dimethyl silicon dichloride, trimethyl silicon chloride, dimethyl tin dichloride, phosphorous trichloride and phenyl phosphorous dichloride. The compounds illustrated above, however, are merely exemplary and do not encompass the wide variety of halides which may be used in this reaction. As set forth above, the metal may be a metal of Groups I–VI of the Periodic Table. Table I below sets forth an illustrative, but not all inclusive, list of the metals which come within the scope and contemplation of the invention:

TABLE I.—GROUPS OF THE PERIODIC TABLE

| I | II | III | IV | V | VI |
|---|-----|-----|-----|-----|-----|
| Cu | Mg | B | Ti | V | W |
|    | Zn | Al | Zr | P | Te |
|    | Cd | Ga | Hf | As |    |
|    | Hg | In | Ge | Sb |    |
|    |    | Tl | Sn |    |    |
|    |    |    | Si |    |    |

The generality of the reaction of the instant invention may be seen from the wide variety of reactants which may be used. The nature of the organic moiety attached to the azido function as well as that possessed by the Grignard reagent are subject to wide selection in the first step and since a large number of metals or metalloids may be reacted in the second step, the permutations and combinations of compounds available are enormous. The only limitation which may be applied to any of the compounds in the reaction is that the organic substituents of said compounds must not contain groups, such as hydroxyl groups, which will react with metal halides. The presence of such reactive groups will lead to the formation of undesirable side reactions and their concomitant products.

GENERAL PROCEDURE

The method of the invention may be illustrated by the following reaction scheme:

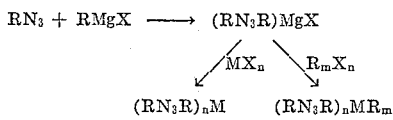

In general, the organic azide is added to an etheral solution of Grignard reagent and the reaction mixture is then refluxed, with added heat if necessary, for a short time. The reaction mixture, which now contains nitrogen-Grignard reagent, is then treated in situ with the metal- or organometal-halide.

The molar ratio of the reactants is not critical, however in the initial reaction of organic azide with Grignard the aliphatic azides are added in slight excess while the aromatic azides are added in stoichiometric amounts. When treating the reaction mixture with metal halide it is only necessary that there be one mole of nitrogen-Grignard present for each mole of metal-halogen to be replaced. For instance, one mole of $AlCl_3$ would be added to three moles of nitrogen-Grignard.

The diluents used in the process of this invention may be any diluent which is non-reactive with the metal halide. Ethers, for example, diethyl ether and petroleum ether are preferred. Other diluents, for example any absolute hydrocarbon such as n-heptane, n-hexane, cyclohexane, benzene, toluene, xylene and similar hydrocarbons may be used.

Because of the tendency of the metal halides and orgametal halides used herein to react with oxygen, the reaction must be run under anhydrous conditions and an inert and non-oxygen-containing atmosphere. Inert atmospheres of helium, nitrogen or argon are preferred.

The invention will be more fully illustrated by the following specific examples. It is to be understood, however, that the examples are illustrative only of the general nature of the invention and are not intended to be construed as limitations thereon.

Example I

This example is intended to illustrate the preparation of symmetrical aromatic metal-triazene compounds.

To about 100 mmoles of phenylmagnesium bromide in 50 ml. diethyl ether, a solution of 12 g. phenyl azide in 50 ml. ether was added dropwise at a rate such that the mixture refluxed slightly. The solution was then heated for an additional 30 minutes to complete the reaction. The ethereal triazeno magnesium bromide was then reacted at room temperature with a solution of 4 g. (30 mmoles) of aluminum trichloride in 50 ml. ether. Orange crystals of tris(1,3-diphenyl triazeno)aluminum started to separate immediately and after one hour the precipitate was collected on a filter and washed with cold ether. The yield was 75–80% of theoretical.

Example II

This example illustrates the preparation of unsymmetrical aryl-alkyl metal-triazene compounds. As illustrative of this type of preparation, the reaction between 1-methyl-3-phenyl trazeno magnesium iodide and aluminum trichloride is set forth below.

A solution of 11.9 g. phenyl azide (100 mmoles) in 50 ml. ether was added dropwise to about 100 mmoles ethereal methylmagnesium iodide. Refluxing began during the addition and was maintained an additional 30 minutes by heating. Then, 4 g. (30 mmoles) of aluminum trichloride in 50 ml. ether was added and, after 10 minutes, 50 ml. n-pentane were added to the stirred reaction mixture. Two layers were formed. The upper layer was separated at once and cooled to −20° C. After two hours the precipitate, consisting of pale yellow crystals of tris(1-methyl-3-phenyl triazeno)Al could be isolated. The compound was recrystallized from n-hexane to give the pure product in a yield of 77%.

Table II, below, sets forth the analysis of the product of Example 2 and also summarizes analyses of novel compounds obtained by Examples 3–5 which were run identically with the procedure of Example 2. The compounds obtained in Examples 3–5 are as follows:

Ex. 3.—tris-(1-methyl-3-perfluoropenyl triazeno)-aluminum,
Ex. 4.—tris-(1-methyl-3-p-tolyl triazeno)-aluminum,
Ex. 5.—tris-(1-methyl-3-p-chlorophenyl triazeno)-aluminum.

TABLE II

| $MX_n$ | Compound | M.P. °C. | Yield, Percent | Analysis, Percent Calcd./Found C | H | N | M | Mol. Wt., Calcd./Found |
|---|---|---|---|---|---|---|---|---|
| (2) $AlCl_3$ | $(C_6H_5N_3CH_3)_3Al$ | 177 | Yellow — 77 | 58.73/58.57 | 5.63/5.82 | 29.36/29.30 | 6.28/6.28 | 429/419 |
| (3) | $(C_6F_5N_3CH_3)_3Al$ | 128 | Slightly yellow — 45 | 36.05/35.79 | 1.28/1.59 | 18.03/17.86 | 3.86/4.15 | 699/673 |
| (4) | $(p\text{-}CH_3C_6H_5N_3CH_3)_3Al$ | 150 | Yellow — 55 | 61.13/61.03 | 6.41/6.49 | 26.74/26.78 | 5.72/5.75 | 472/367 [1] |
| (5) | $(p\text{-}ClC_6H_4N_3CH_3)_3Al$ | 127 | do — 60 | 47.34/47.51 | 3.97/4.23 | 23.66/23.40 | 5.06/5.19 | 533/325 [1] |

[1] Partial dissociation.

Example 6

This example illustrates the preparation of symmetrical aliphatic metal-triazene compounds.

About 100 mmoles of methylazide was dried and condensed in a cooled flask (−20°) which contained an ethereal solution of 100 mmoles methyl magnesium iodide. After the cooling system was removed, the mixture warmed up and was allowed to reflux for twenty minutes, resulting in a viscous solution. The magnesium intermediate thus prepared was then reacted at room temperature with a suspension of zirconium tetrachchloride etherate in 50 ml. ether. After shaking the mixture for five minutes, 100 ml. of n-pentane were added which produced two layers. The upper orange layer, on separation and removal of solvents, yielded an orange oil which could again be separated into an orange solution and a yellow precipitate by the addition of n-pentane. The yellow precipitate was discarded and the orange solution was evaporated. The orange residue was sublimed in vacuo (70–75°/0.1 mm.) to give tetra(1,3-dimethyl triazeno)zirconium in a yield of 75%. Table III below summarizes the results obtained in Examples 7 through 17. The novel compounds obtained are as follows:

Ex. 7.—tetra(1,3-dimethyltriazeno)zirconium,
Ex. 8.—tris(1,3-dimethyltriazeno)boron,
Ex. 9.—tris(1,3-dimethyltriazeno)aluminum,
Ex. 10.—bis(1,3-dimethyltriazeno)dimethyl silicon,
Ex. 11.—1,3-dimethyltriazeno trimethyl silicon,
Ex. 12.—bis(1,3-dimethyltriazeno)dimethyl tin,
Ex. 13.—1,3-dimethyltriazeno dimethyl tin iodide,
Ex. 14.—1,3-dimethyltriazeno dimethyl tin bromide,
Ex. 15.—tetra(1,3-dimethyltriazeno)titanium,
Ex. 16.—tris(1,3-dimethyltriazeno)phosphorus,
Ex. 17.—bis(1,3-dimethyltriazeno)phenyl phosphorus.

TABLE III

| MX$_n$ | Compound | M.P., °C./mm. | Color | Yield[1] | Analysis, Percent Calcd./Found | | | | | Mol. Wt.,[2] Calcd./Found |
|---|---|---|---|---|---|---|---|---|---|---|
| | | | | | C | H | N | M | Hal | |
| (7) ZrCl$_4$ | Zr(dmt)$_4$ | 120 | Orange | 75 | 25.32/25.33 | 6.37/6.43 | 44.28/44.30 | 24.03/24.36 | | 380/379 |
| (8) BF$_3$ | B(dmt)$_3$ | [3] 108–110 | Colorless | 20 | 31.74/31.87 | 7.99/8.08 | 55.51/55.45 | 4.76/4.89 | | 227/214 |
| (9) AlCl$_3$ | Al(dmt)$_3$ | 125–127 | do | 71–72 | 29.63/29.83 | 7.46/7.65 | 51.82/51.70 | 11.09/11.48 | | 243/239 |
| (10) (CH$_3$)$_2$SiCl$_2$ | (CH$_3$)$_2$Si(dmt)$_2$ | 38/0.2 | do | 85 | 35.61/35.74 | 8.97/9.07 | 41.53/41.40 | 13.88/13.69 | | 202/190 |
| (11) (CH$_3$)$_3$SiCl | (CH$_3$)$_3$Si(dmt) | 57/50 | do | 90 | 41.34/41.52 | 10.41/10.54 | 28.92/29.21 | 19.33/19.73 | | 145/141 |
| (12) (CH$_3$)$_2$SnCl$_2$ | (CH$_3$)$_2$Sn(dmt)$_2$ | 50–52/0.2 | do | 26 | 24.60/24.79 | 6.19/6.09 | 28.69/28.40 | 40.52/40.16 | | 293/278 |
| (13) (CH$_3$)$_2$SnCl$_2$ | (CH$_3$)$_2$Sn(dmt)I | 50/0.2 | do | 85 | 13.81/13.97 | 3.43/3.54 | 12.08/11.37 | 34.13/34.25 | 36.49/36.46 | 345/333 |
| (14) (CH$_3$)$_2$SnCl$_2$ | (CH$_3$)$_2$Sn(dmt)Br | 38/0.2 | do | 45 | 15.98/15.75 | 4.02/4.23 | 13.97/14.21 | 39.46/39.43 | 26.57/26.76 | 301/305 |
| (15) TiCl$_4$ | Ti(dmt)$_4$ | 130 | Dark red | 46 | 28.58/28.44 | 7.19/7.39 | 49.99/49.77 | 14.24/14.03 | | 336/312 |
| (16) PCl$_3$ | P(dmt)$_3$ | 91–92/0.2 | Colorless | 52 | 29.15/28.89 | 7.34/7.10 | 50.99/51.29 | 12.53/12.26 | | 247/241 |
| (17) C$_6$H$_5$PCl$_2$ | C$_6$H$_5$P(dmt)$_2$ | 109/0.2 | do | 40 | 47.61/47.90 | 6.79/6.75 | 33.32/33.13 | 12.28/12.12 | | 252/243 |

[1] After purification by sublimation or distillation.  [2] Determined cryoscopically in benzene.  [3] B.P., °C.

The scope of the invention is not intended to be limited to the above-listed type compounds since in the general formula, (RN$_3$R)$_n$M, M may be a metalloid or metal-containing group. For example, the metal atom may be additionally attached to further triazene groups or residues thereof. Further, other radicals, such as halides, etc., derived from the metal halide, or organometal halide reacted therewith, may be additionally attached to the metal atom.

The organometal compounds of this invention may be described as covalent and containing a sigma metal-nitrogen bond. To the alpha nitrogen atom there is attached an organic radical such as, for example, a phenyl group. Additionally, the other organic radical is attached to the terminal imino nitrogen atom. The triazeno group may, however, act as a bidentate intra- or inter-molecular chelating ligand depending on the metal atom.

The compounds of this invention are useful in various diverse manners. For example, the compounds act as polymerization chain transfer agents and inhibitors, but may also be used as activators in the polymerization of unsaturated monomers such as styrene, acrylamide, acrylonitrile, ethylene, butadiene, isoprene and copolymerization thereof. The compounds of the invention are additionally useful as blowing agents for polyvinyl chloride and the 1,3-diphenyltriazeno ligand enables the compounds to be used as rubber crosslinking agents.

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. An organometallic compound selected from the group consisting of:

Tris(1-methyl-3-phenyltriazeno)aluminum,
Tris(1-methyl-3-perfluorophenyltriazeno)aluminum,
Tris(1-methyl-3-p-tolyltriazeno)aluminum,
Tris(1-methyl-3-p-chlorophenyltriazeno)aluminum,
Tetra(1,3-dimethyltriazeno)zirconium,
Tris(1,3-dimethyltriazeno)boron,
Tris(1,3-dimethyltriazeno)aluminum,
Bis(1,3-dimethyltriazeno)dimethyl silicon,
1,3-dimethyltriazeno trimethyl silicon,
Bis(1,3-dimethyltriazeno)dimethyl tin,
1,3-dimethyltriazeno dimethyl tin iodide,
1,3-dimethyltriazeno dimethyl tin bromide,
Tetra(1,3-dimethyltriazeno)titanium,
Tris(1,3-dimethyltriazeno)phosphorus,
Bis(1,3-dimethyltriazeno)phenyl phosphorus.

2. The method of preparing a triazeno-metallic compound comprising the steps of:
  (a) reacting under reflux in a dry ether solvent an organic azide of the formula RN$_3$ wherein R is selected from the group consisting of alkyl, aryl, alkaryl, aralkyl, and cycloalkyl with a reagent of the formula RMgX wherein R is as defined above and X is selected from the group consisting of Cl, Br and I,
  (b) dissolving the thus formed reaction mixture in a solution of a dry ether solvent with a halide selected from the group consisting of MX$_n$ and R$_m$MX$_n$ wherein M is a metal of Groups III–V of the Periodic Table, R is as defined above, X is F, Cl, Br and I and $m$ and $n$ are integers (in a solution of a dry ether solvent), and
  (c) reacting the solution formed in (b) at between room temperature and −20° C.

3. The method of claim 2 wherein the dry ether solvent is diethyl ether.

4. The method of claim 2 wherein RN$_3$ is selected from methyl azide, phenyl azide, tolyl azide, perfluorophenylazide and chlorophenylazide.

5. The method of claim 2 wherein M is a metal selected from the group consisting of Al, Ti, Sn, Zr, Si, P and B.

References Cited
UNITED STATES PATENTS
2,272,134  2/1942  Shappirio _____ 260—140 X

FOREIGN PATENTS
1,012,735  4/1952  France.

OTHER REFERENCES
Brinckman et al.: Chem. Ind. (London) vol. of 1963, pp. 1124–1125.
Dermer et al., C. A.: vol. 29, p. 1350[2] (1935).
Knowles et al.: J. Am. Chem. Soc., vol. 64, pp. 935–937.
Kharasch et al.: "Grignard Reactions of Nonmetallic Substances," p. 117 (1954).

FLOYD D. HIGEL, *Primary Examiner.*